1,572,821

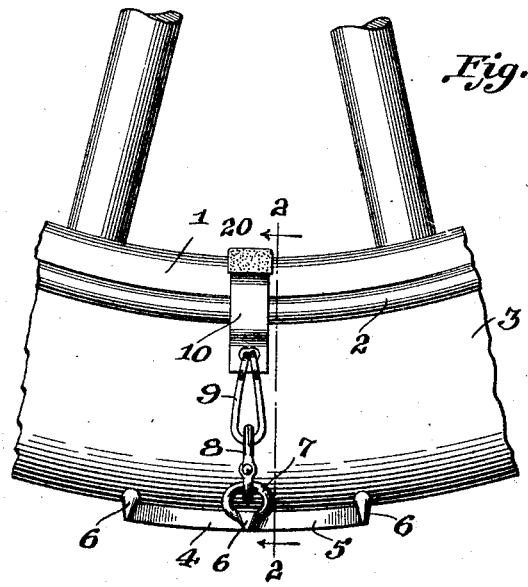
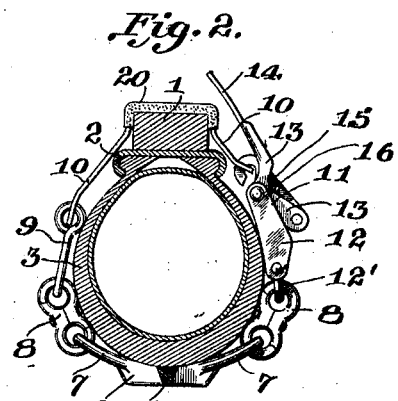
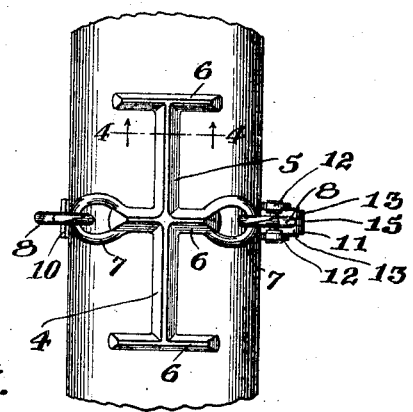
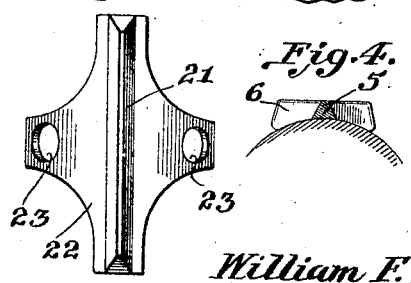
Inventor
William F. Staggers
By Eccleston & Eccleston
Attorneys Patented Feb. 9, 1926.

UNITED STATES PATENT OFFICE.

WILLIAM F. STAGGERS, OF MANNINGTON, WEST VIRGINIA.

ANTISKID DEVICE.

Application filed January 9, 1924. Serial No. 685,253.

*To all whom it may concern:*

Be it known that I, WILLIAM F. STAGGERS, a citizen of the United States, residing at Mannington, in the county of Marion and State of West Virginia, have invented certain new and useful Improvements in Antiskid Devices, of which the following is a full, clear, and exact description.

The invention relates to antiskid devices for vehicle tires, and one of the objects of the invention is to provide a device of this character which is readily adaptable to roads of different types.

Other objects of the invention are to provide a device of this character which is inexpensive in manufacture, which is highly efficient on all types of roads, which may be quickly and easily applied to the tires, and which is not injurious to the tires.

Other and further objects and advantages of the invention will be apparent from the following detailed description, when taken in connection with the accompanying drawings; in which, Figure 1 is a side view of a portion of a wheel and tire, with the antiskid device mounted thereon.

Figure 2 is a transverse sectional view taken on line 2—2 of Figure 1.

Figure 3 is a plan view of the antiskid device illustrated in Figure 1.

Figure 4 is a detail sectional view taken on line 4—4 of Figure 3; and

Figure 5 is a plan view of an antiskid device for the front tires.

Referring to the drawings more in detail, numeral 1 refers to the felly of an automobile wheel, numeral 2 indicates the rim, and numeral 3 indicates the tire.

The antiskid device to be employed on muddy or sandy roads is indicated generally by numeral 4, and consists of a relatively long longitudinal rod 5 which is preferably triangular in cross-section and which is slightly curved longitudinally to conform to the curvature of the tire. Formed integral with the relatively long longitudinal rod 5 are three relatively short transverse rods 6, and these relatively short transverse rods are also preferably triangular in cross-section and are curved to conform to the transverse curvature of the tire. The three transverse rods are preferably arranged at the ends and at the middle of the longitudinal rod. Attaching eyes 7 are carried by each end of the middle transverse rod and these attaching eyes are, in the preferred construction, formed integral with the middle rod.

Attached to each of the eyes 7 is a quick detachable hook 8, and in the opposite end of one of these hooks is mounted a loop member 9, and to this loop member is attached a metallic strip 10 which is bent to fit about and conform to the shape of the felly. The opposite end of this metallic strip 10 is adapted to receive one end of a clamping device referred to generally by numeral 11, and the opposite end of the clamping device is attached to the other quick detachable link 8 by means of a loop 12'.

The clamping device per se forms the subject matter of a separate Patent No. 1,529,558 dated March 10, 1925, and the construction of the clamping device will therefore be described in a more or less general way.

The clamping device 11 consists of two spaced walls 12, and pivotally mounted between and at one end of these walls is a bell-crank lever 13. The bell-crank lever 13 has an operating handle 14, and the opposite end of the lever is formed of spaced members between which is pivotally attached a hook 15. This hook is provided with an aperture adapted to receive a cotter pin 16 when the device is in clamped position.

In Figure 2 the clamping device is shown in clamped or operative position. To release the device it is only necessary to remove the cotter pin and swing the handle 14 to the right (Figure 2), whereupon the lower end of the bell-crank lever 13 will move inwardly and upwardly and carry the hook 15 with it, thereby releasing the strain on the device and permitting the quick removal of the entire apparatus or the antiskid element 4, as may be desirable.

It is preferred, though not essential, that the portion of the metallic strip fitting about the felly should be wrapped with some padding fabric, as indicated by numeral 20.

Figure 7 shows an antiskid device particularly adapted for the front wheels. This device consists of a longitudinal rib 21, which is preferably triangular in cross-section as in the previously described construction. And integral with this longitudinal rib is a relatively thin web of sheet metal 22 which is curved to conform to the curvature of the tire. The web 22 is provided with apertures 23 which are adapted to be engaged by the quick detachable hooks 8 in exactly the same manner as previously described.

In accordance with the patent statutes, I have described what I now believe to be the best embodiment of the invention, but I do not wish to be understood thereby as limiting myself or the scope of the invention, as many changes and modifications may be made without departing from the spirit of the invention; all such I aim to include in the scope of the appended claims.

Having fully described the invention, what I claim as new and desire to secure by Letters Patent is:

1. An antiskid device including a metallic rod adapted to extend longitudinally of the tire, a plurality of transverse rods carried by the longitudinally extending rod, and means for attaching chains to the ends of one of the intermediate transverse rods, the ends of the remaining transverse rods being free.

2. An antiskid device including a metallic rod adapted to extend longitudinally of the tire, said rod curved to conform to the curvature of the tire and triangular in cross section, three transversely extending rods carried by said longitudinally extending rod, and means for attaching a chain to the ends of the central transverse rod, the ends of the other transverse rods being free.

3. An antiskid device including a metallic rod adapted to extend longitudinally of the tire said rod being curved to conform to the curvature of a tire and triangular in cross section, three relatively short transverse rods integral with the longitudinal rod and carried at each end and the middle thereof, said transverse rods being triangular in cross section and curved to conform to the curvature of the tire, eyes formed in the ends of one of said transverse rods, and an attaching chain adapted to engage said eyes.

WILLIAM F. STAGGERS.